April 15, 1924.  1,490,413
B. H. BLOOD
LINEAR MEASURING MACHINE
Filed Dec. 3, 1921  2 Sheets-Sheet 1
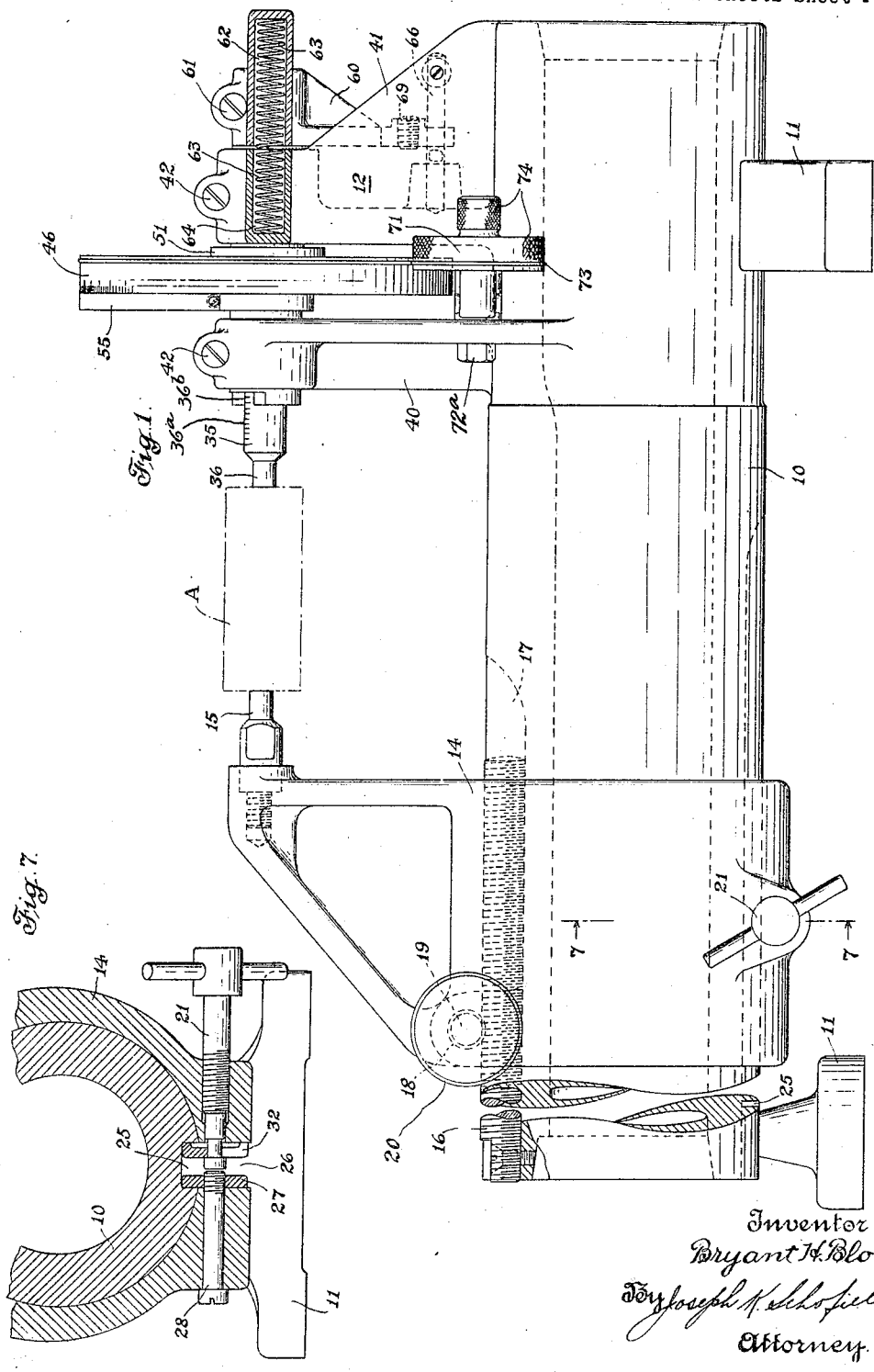
Inventor
Bryant H. Blood
By Joseph H. Schofield
Attorney.

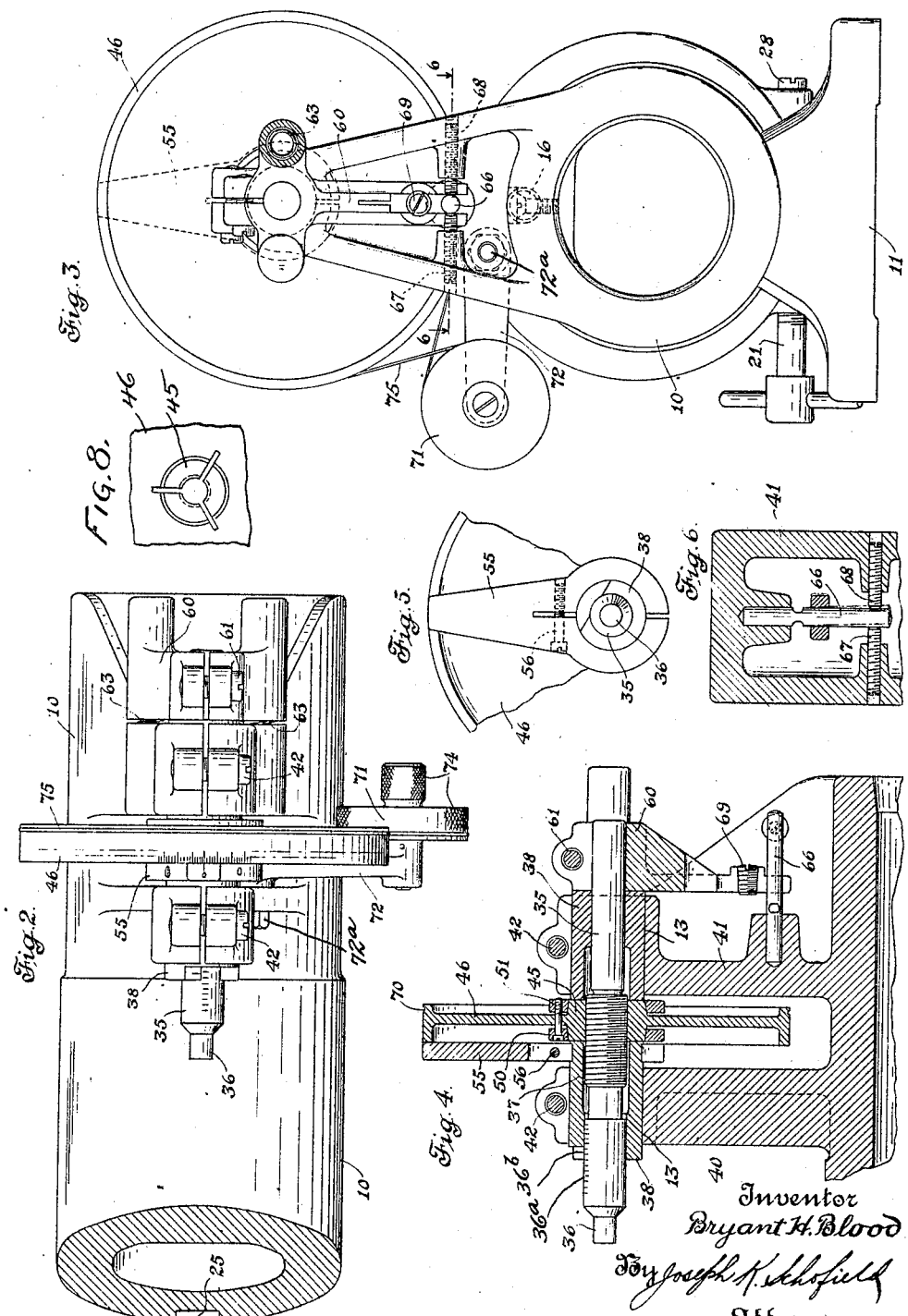

Patented Apr. 15, 1924.                                                           1,490,413

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

LINEAR MEASURING MACHINE.

Application filed December 3, 1921.   Serial No. 519,731.

*To all whom it may concern:*

Be it known that I, BRYANT H. BLOOD, a citizen of the United States, and a resident of Hartford, in the county of Hartford and State of Connecticut, have invented certain new and useful Improvements in Linear Measuring Machines, of which the following is a specification.

This invention relates to a linear measuring machine and in particular to one adapted to measure outside linear dimensions over relatively wide differences to a high degree of precision.

An object of the invention is to provide a linear measuring machine which will be compact, simple, readily operated, and one which will not be easily put out of order.

Another object of the invention is to provide means on the measuring machine which will permit the measuring spindle to be positioned with its anvil in measuring contact with the specimen being measured quickly and to a high precision, and which will normally prevent further movement of the measuring spindle beyond its correct operative position.

Another object of the invention is to provide resilient means normally forcing the measuring spindle in one direction so that the lost motion or back lash of its screw threaded part with a nut cooperating therewith is continually held on the same side.

Another object is to provide a simple and easily adjusted means for correcting any error in the lead of the screw threads on the measuring spindle, this means being also adapted to prevent rotation of the measuring anvil during measuring operations.

One feature which enables me to obtain high precision for which this measuring machine is adapted in a comparatively simple manner is that I mount two relatively long compressive springs, one end of each being fixed in the fixed head of the measuring machine and the other ends being fixed in a member fastened to the measuring spindle. By means of these springs a uniform force is applied to the measuring spindle away from the opposite engaging member and lost motion between parts of the mechanism is always held on the same side of the parts.

Another feature which is advantageous is that I provide a narrow belt or cord passing around the measuring dial of the machine and also over a small grooved pulley adjacent the fixed head. By rotating this small pulley manually the measuring dial may be slowly brought up into operative position in contact with the specimen being measured with a predetermined definite pressure depending upon the tension of this belt, or cord, after which the cord slips upon the dial or pulley and thus the dial is prevented from further rotation and the measuring spindle is held from advancing beyond its correct measuring position.

A further object of the invention is to provide a simple means for advancing the movable head along the base toward or from the fixed head and clamping it in any adjusted position on the base.

With these and other objects in view, my invention consists in the features of construction and operation set forth in the following specification and illustrated in the accompanying drawings.

In the accompanying drawings annexed hereto and forming a part of this specification, I have shown my invention embodied in a linear measuring machine of relatively small size but it will be understood that the invention can be otherwise embodied and that the drawings are not to be construed as defining or limiting the scope of the invention, the claims appended to this specification being relied upon for that purpose.

In the drawings:

Figure 1 is a front elevation of the entire measuring machine.

Fig. 2 is a plan view of one end thereof.

Fig. 3 is an end view taken from the right as seen in Fig. 1.

Fig. 4 is a vertical view in section of the fixed head and measuring spindle.

Fig. 5 is a detail view of the zero carrying arm.

Fig. 6 is a sectional view of a part of the invention taken on line 6—6 of Fig. 3.

Fig. 7 is a sectional view of the movable head clamping means.

In the above mentioned drawings I have shown but one modification of the invention which is now deemed preferable but it is to be understood that changes and modifications may be made within the scope of the appended claims without departing from the spirit of the invention.

Briefly, my invention in its broadest aspect comprises the following principal parts; first, a base; second, a fixed head preferably formed integrally near one end of said base; third, a movable head carrying an anvil, the head being adjustable toward or from said fixed head; fourth, a movable measuring spindle in said fixed head; fifth, a graduated dial member in threaded connection with a screw threaded portion of said measuring spindle; sixth, a cord or belt surrounding said dial and a small pulley; seventh, an arm fastened to and depending from the measuring spindle adapted to engage an adjustable rod in said head; and eighth, springs normally forcing said measuring anvil from the anvil in the movable head.

Referring more in detail to the figures of the drawings, I provide a base in the form of a generally cylindrical member 10 having pedestals 11 at either end so that it may rest upon a bench or table. Preferably, the pedestal 11 at one end is provided with two feet and the one at the opposite end with a singe foot so that the base 10 will be supported upon three points and any distortion of the bench or table upon which the measuring machine is set will not distort the base and introduce a source of possible error.

Near one end of the base is a fixed head 12 which preferably may be in the form of two upright members formed integrally with the base 10. This head 12 is provided with bearings 13 extending in a direction parallelly with the axis of the base. This head 12 therefore forms a rigid support in which the measuring spindle and its cooperating members may be mounted. Movably mounted on the base 10, preferably, on a cylindrical portion is a movable head 14 provided with a fixed anvil 15 in alignment with the spindle in the fixed head 12. This movable head 14 may be adjusted toward or from the opposite head 12 on the base 10 by a screw threaded member 16 fixed in a depression 17 in the base 10 and engaged by a pinion or worm 18 mounted on a cross shaft 19. A knurled head 20 on this shaft 19 permits easy and accurate adjustment of this movable head 14. By means of a clamping screw 21 this movable head 14 may be rigidly clamped in any desired adjusted position along the base 10.

The particular form of clamping means for the movable head 14 is of novel construction. A spline 25 is provided in the base 10 extending longitudinally, and the lower portion of the movable head 14 is split at 26 as shown in Fig. 7. The movable head 14 is provided with a thin plate 27 held in position within the slit 26 by a screw 28. The clamping screw 21 is threaded into the movable head 14 in the opposite side to that in which the plate 27 is mounted. On the inner end of clamping screw 21 is a slitted plate 32 held in place on clamping screw 21 by means of a head on the inner end of clamping screw 21. The effect of tightening the screw 21 is therefore to slightly oscillate the plate 32 and thus draw one side of the split portion of movable head 14 in which the clamping screw 21 is mounted more closely to its opposite side and thus tighten the head 14 in adjusted position on the base 10. By rotating the clamping screw 21 in an opposite direction to loosen it, the head of this screw 21 abuts against the inner end of screw 28 thus forcing the parts of the head 14 surrounding the base 10 away from each other and permitting easy adjustment of the head 14 along the base 10.

Coming now to a description of the parts mounted in the fixed head 12 and forming operative parts of the measuring devices, this head 12, as shown in Fig. 1, is formed by two upwardly extending members suitably spaced apart to accommodate the measuring dial.

Within both uprights forming the fixed head 12 is the axially movable measuring spindle 35 having an anvil 36 at its forward end and a screw threaded portion 37 in the middle section of its length. This, as shown clearly in Fig. 4, is mounted in bearing members or bushings 38 mounted in the bearings 13 in the uprights 40 and 41 forming the fixed head 12. These bearing members or bushings 38 are adapted to be clamped in adjusted position within the bearings 13 by clamping screws 42 as shown in Fig. 2. The holes provided in these bearing members 38 are very carefully lapped to engage cylindrical portions on the measuring spindle 35. The central portion of the measuring spindle as above stated is screw threaded as shown at 37, these screw threads being very carefully ground and finished so that the lead of this screw is uniform to a very high precision throughout its entire length. This screw threaded portion 37 of the measuring spindle 35 is engaged by a threaded nut 45 forming the hub or central portion of a large graduated dial 46, the periphery of which is evenly and accurately graduated as shown in Fig. 1. It will be seen from this construction that rotation of the dial 46 will move the measuring spindle 35 axially, means being provided to prevent further rotation of this spindle 35 after it has reached measuring position. The nut 45 on the dial 46 is disposed between the opposite adjacent end surfaces of the bearing members 38 which may easily be adjusted axially to prevent undue lost motion, these being so adjusted that no play is permitted between the nut 45 of the dial member 46 and the bearing members 38.

The nut 45 may be enclosed between two annular rings 50 and 51 engaging extended hub portions of the nut, these rings 50 and 51 being held together by a plurality of screws one of which is shown in Fig. 4. By tightening these screws and drawing the rings 50 and 51 more closely together, the metal comprising the nut 45 is crowded inwardly slightly so that a small amount of wear that may develop on the screw threads of the nut 45 and spindle 35 may be taken up. If desired, the hub forming the nut 45 may be split on one or more sides so that any wear on the screw threads may be more readily taken up. Surrounding the rear end of the forward bearing member 38 is an arm 55 which may be clamped in any desired and adjusted position on this bushing 38 by means of the clamping screw 56. This arm 55 at its outer end carries a single zero mark. The end surface of this arm is flush with the periphery of the dial 46, the zero arm being used in connection with the graduations on the dial to determine the position of the measuring spindle.

The rear end of the spindle 35 has mounted thereon a depending arm 60 which may be clamped in position on the spindle by means of a clamping screw 61. Recesses 62 are provided in this arm member on either side of the measuring spindle 35 and extending parallelly therewith in which compressive springs 63 may be mounted. The fixed head 12 has similar recesses 64 formed therein which are directly in alignment with the recesses of the arm 60 into which these springs 63 may extend. With the arm 60 clamped in position on the measuring spindle 35, the spindle 35 together with the arm 60 is forced by springs 63 in an axial direction away from the opposite or movable head 14 so that all lost motion or back lash between the threaded portions 37 of the measuring spindle 35 and the nut 45 is continuously taken up upon the same side of the threads. It will be obvious from this construction that when the spindle 35 is brought into proper measuring position it will not move axially relative to the nut 45.

It will be seen that if the lead of the screw threads 37 on the measuring spindle 35 is not absolutely correct that a very slight rotation of the spindle as it moves forward and rearward may be employed to correct this slight error. I, therefore, provide a lead correcting or compensating means so that a very small amount of twist or rotation may be given to the spindle 35 as it moves forward and rearward. For this purpose I mount a cylindrical rod 66 in the fixed head 12 in a plane parallel to and directly below the axis of the measuring spindle 35. The outer end of this rod 66 may be laterally adjusted slightly by means of oppositely disposed screw threaded members 67 and 68. The arm 60 previously referred to is slitted at its lower end, as shown most clearly in Fig. 3, so that the lower ends of the arm 60 may engage opposite sides of this cylindrical rod 66. A tapered screw 69 is provided in the arm 60 engaging opposite sides of this slitted portion. By adjustment of this tapered screw 69, the inner sides of the extensions on the arm 60 may be adjusted to bear firmly but slidably against the sides of rod 66. It will be obvious that if this cylindrical rod 66 extends in a direction absolutely parallel to the axis of the measuring spindle 35 then no twist will be given to the spindle in its forward and rearward movements, and, in this position of rod 66 no correction will be applied to the screw threads 37 on the spindle. However, by adjusting the oppositely disposed screws 67 and 68 bearing against the outer end of rod 66 the free end of this rod may be moved laterally a slight distance so that the arm 60 and consequently the measuring spindle 35 are rotated through a fraction of a degree during the length of movement of the spindle 35. It will be understood that this adjustment of the cylindrical rod 66 may be made for each measuring spindle in accordance with the observed inaccuracies of the individual screw to entirely compensate it. For the error in lead to be entirely compensated, this error must be entirely uniform throughout its length. The rod 66 is suitably necked adjacent its end fastened to the head 12 so that it will be substantially straight throughout its length in different adjusted positions.

In obtaining linear measurements to a high degree of precision, the fixed anvil 15 and the anvil 36 on the measuring spindle 35 must be brought into contact with the specimen being measured with a carefully regulated pressure and each measurement of a standard end measure used with the machine and of a specimen this pressure must be identical. This is necessary to place each part of the device under exactly the same strains during measurements so that any deflection or strain of the operative parts will be equal each time the machine is utilized. I therefore provide the periphery of the graduated dial 46 with a small groove 70 and mount a small pulley 71 on an adjustable arm 72 extending from the head 12 adjacent this dial 46. This pulley 71 is provided with a small groove 73 in the same plane with the groove 70 in the dial 46. The pulley 71 is also provided with knurled portions 74 of different diameters by means of which it may be conveniently rotated either rapidly or slowly. The arm 72 is mounted so that it may swing about the stud or screw 72$^a$ and, by loosening this screw, the arm may be adjusted to place any desired tension on a cord passing around the pulley 71 on the arm.

Extending around the dial 46 and the pulley 71 in their respective grooves is a narrow belt or cord 75. It will be seen that with the arm 72 on which the small pulley 71 is mounted adjusted so that this belt or cord 75 will have a slight tension, rotation of the small pulley 71 by means of the knurled head 74 will very slowly and frictionally rotate the dial 46, and, when the pressure of the specimen against the anvil 36 on measuring spindle 35 reaches a predetermined amount, the cord or belt 75 will slip preferably about the pulley 71 thus preventing further rotation of the dial 46 and also preventing further advancing movement of the measuring spindle 35.

Coming now to a description of the method of operating this measuring machine; with the movable head 14 positioned along the base 10 to an approximate distance governed by the length of the specimen desired to be measured, the setting of the machine is obtained by inserting a standard end measure A as shown in Fig. 1 between the anvils 36 and 15 respectively on the fixed and movable heads 12 and 14. The movable head 14 is so adjusted along the base that with the measuring spindle 35 set for one of its zero positions and the standard end measure A inserted, the zero arm 55 may be adjusted on the bearing member 38 so that it will be opposite the zero on the graduated dial 46. The machine is then set to measure specimens whose dimension is approximately that of the standard end measure used in setting the movable head 14. Axial adjustment of spindle 35 by rotation of dial 46 permits dimensions to be measured within the range of movement of the measuring spindle 35 without resetting the head 14 by a different standard end measure. To facilitate reading the position of the measuring spindle, its forward end is provided with graduations 36ª, one being provided to represent a complete revolution of the graduated dial 46. These graduations on the spindle 35 in conjunction with a zero mark 36ᵇ on a cut away portion of forward bushing 38 indicate roughly the position of spindle 35.

By means of the springs 63 resiliently forcing the measuring spindle 35 to the right and away from anvil 15 as shown in Fig. 1, the back lash or lost motion between operative parts of the machine, that is between the threads 37 and nut 45, is constantly held upon the same side of these screw threads and, as the measuring spindle 35 is brought into measuring position, there will be no tendency for the spindle 35 to move further back or for the dial to be rotated beyond its measuring position when in contact with the specimen being measured than when the spindle is in inoperative position. This prevents constant movement back and forth of the spindle 35 within the threads of the nut 45 and the film of lubricant between the screw threads 37 on the spindle 35 and those on nut 45 is maintained always at a constant thickness rather than at constantly varying thicknesses when in operative and inoperative position due to varying pressures forcing the spindle 35 more and more toward the right as the spindle 35 is brought into operative position.

What I claim is:

1. A linear measuring machine comprising in combination, a base having measuring heads thereon, oppositely disposed measuring anvils in said heads, one of which is movable toward or from the opposite anvil, a measuring spindle upon which said movable anvil is mounted, and a member on said spindle supporting compressive springs between said member and a portion of said head whereby said anvils normally are resiliently forced apart and all lost motion is taken up in the same direction.

2. A linear measuring machine comprising in combination, a base having measuring heads thereon, oppositely disposed measuring anvils in said heads, one of which is movable toward or from the opposite anvil, a measuring spindle upon which said movable anvil is mounted, a rotatable dial thereon, a threaded portion on said spindle engaging threaded portions on said rotatable dial member, a member fastened to said spindle, and springs disposed between said member and head whereby lost motion between said threaded portions of the spindle and the rotatable dial is normally resiliently taken up in the same direction.

3. A linear measuring machine comprising in combination, a base, a fixed measuring head, a head movable toward or from said fixed head and having an anvil thereon, a measuring spindle in said fixed head having an anvil thereon, screw threads on said spindle, a rotatable graduated dial engaging said spindle whereby rotation of said dial will move said spindle axially toward or from the opposite anvil, and means comprising an arm fixed to said spindle and a laterally adjustable rod mounted in a plane parallel to said spindle engaged thereby whereby said spindle as it moves toward or from said opposite anvil may be rotated slightly to correct an error in lead of the screw threads on said spindle.

4. A linear measuring machine comprising in combination, a base, a fixed measuring head, a head movable toward or from said fixed head and having an anvil thereon, a measuring spindle in said fixed head having an anvil thereon, screw threads on said measuring spindle, a rotatable graduated dial engaging said spindle whereby rotation of said dial will move said spindle axially toward or from the opposite anvil, means comprising an arm fixed to said spindle and a rod mounted in a plane parallel to said spindle engaged thereby whereby said movable anvil as it moves toward or from said opposite anvil is rotated slightly to correct an error in lead of the screw threads on said spindle, and adjusting means for said rod whereby one end may be laterally adjusted predetermined amounts in accordance with the error of said screw threads.

5. A linear measuring machine comprising in combination, a base, a fixed measuring head, a head movable toward or from said fixed head and having an anvil thereon, a measuring spindle in said fixed head having an anvil thereon, a rotatable graduated dial engaging said spindle whereby rotation of said dial will move said spindle axially toward or from the opposite anvil, and means comprising a depending arm fixed to said spindle provided with a split portion, an obliquely positioned rod engaged thereby whereby said movable anvil as it moves toward or from said fixed anvil may be rotated slightly to correct an error in lead of the screw thread on said anvil depending on the adjustment of said rod, said arm having adjusting means whereby its split portion may be adjusted to slidably engage said rod.

6. A linear measuring machine comprising in combination, a base, a fixed measuring head, a head movable toward or from said fixed head and having an anvil thereon, a measuring spindle in said fixed head having an anvil thereon, a rotatable graduated dial engaging said spindle whereby rotation of said dial will move said spindle axially toward or from the opposite anvil, and means comprising a depending arm fixed to said spindle provided with a split portion, an obliquely positioned rod engaged thereby whereby said movable anvil as it moves toward or from said fixed anvil may be rotated slightly to correct an error in lead of the screw thread on said anvil depending on the adjustment of said rod, said arm having a tapered screw engaging said split portion whereby said split portion may be adjusted to slidably engage said rod.

7. A linear measuring machine comprising in combination, a base having measuring heads thereon, oppositely disposed measuring anvils in said heads, a measuring spindle carrying one of said anvils and being movable axially in one of said heads, and means for moving the measuring spindle into measuring position comprising a graduated dial in threaded connection with said spindle, friction means for rotating said dial whereby the measuring spindle may be brought into contact with the specimen being measured after which said friction means may slip thus preventing further axial movement of said spindle.

8. A linear measuring machine comprising in combination, a base having measuring heads thereon, oppositely disposed measuring anvils in said heads, a measuring spindle carrying one of said anvils and being movable axially in one of said heads, and means for moving the measuring spindle into measuring position comprising a graduated dial in threaded connection with said spindle, friction rotating means surrounding said dial whereby it may be rotated and the measuring spindle may be brought into contact with the specimen being measured after which said friction means may slip thus preventing further axial movement of said spindle.

9. A linear measuring machine comprising in combination, a base having measuring heads thereon, oppositely disposed measuring anvils in said heads, a measuring spindle carrying one of said anvils and being movable axially in one of said heads, and means for moving the measuring spindle into measuring position comprising a graduated dial in threaded connection with said spindle, a belt passing over said dial and a disk adjacent thereto whereby by rotating said disk the graduated dial may be rotated until the measuring spindle is in contact with the specimen being measured after which the belt may slip thus preventing further axial movement of said spindle.

10. A linear measuring machine comprising in combination, a base having measuring heads thereon, oppositely disposed measuring anvils in said heads, a measuring spindle carrying one of said anvils and being movable axially in one of said heads, and means for moving the measuring spindle into measuring position comprising a graduated dial in threaded connection with said spindle, a belt passing over said dial and an adjustably mounted disk of smaller size adjacent thereto, whereby by rotating said adjustably mounted disk the graduated dial is slowly rotated until the measuring spindle is in contact with the specimen being measured after which the belt may slip thus preventing further axial movement of said spindle.

11. A linear measuring machine comprising in combination, a base having measuring heads thereon, oppositely disposed measuring anvils in said heads, a measuring spindle carrying one of said anvils and being movable axially in one of said heads, and means for moving the measuring spindle into measuring position comprising a graduated dial in threaded connection with said spindle, a belt passing over said dial and a disk adjacent thereto, whereby by rotating said disk the graduated disk is rotated until the measuring spindle is in contact with the specimen being measured after which the belt may slip thus preventing further axial movement of said spindle, and means whereby the tension of said belt may be adjusted.

12. A linear measuring machine comprising in combination, a base, a fixed head thereon, a head movable along said base toward and from said fixed head, and means to move said latter head along said base comprising a threaded member fixed longitudinally of said base and a worm rotatably mounted in said head and engaging said threaded member.

13. A linear measuring machine comprising in combination, a base, a fixed head thereon, a head movable along said base toward and from said fixed head, and means to move said latter head along said base comprising a threaded member fixed longitudinally of said base and a worm rotatably mounted in said head at right angles to the direction of movement of said head and engaging said threaded member.

14. A linear measuring machine comprising in combination a base provided with a depression formed longitudinally thereof, a fixed head thereon, a head movable along said base toward and from said fixed head, and means to move said latter head along said base comprising a threaded member fixed within said depression and a worm rotatably mounted in said head at right angles to the direction of movement of said head and engaging said threaded member.

15. A linear measuring machine comprising in combination, a base provided with a spline formed longitudinally thereof, a fixed head thereon, a head movable along said base, and means to clamp said latter head in adjusted position along said base comprising a fixed plate on said head engaging one side of said spline, an oppositely disposed plate adapted to be drawn into engagement with the opposite side of said spline, and means to move said last mentioned plate to clamp and unclamp said head.

16. A linear measuring machine comprising in combination, a base provided with a spline formed longitudinally thereof, a fixed head thereon, a head movable along said base, and means to clamp said latter head in adjusted position along said base comprising a fixed plate on said head engaging one side of said spline, an oppositely disposed plate adapted to be drawn into engagement with the opposite side of said spline to clamp said head in position, and means to unclamp said head.

17. A linear measuring machine comprising in combination, a base provided with a spline formed longitudinally thereof, a fixed head thereon, a head movable along said base, means to clamp said latter head in adjusted position along said base comprising a fixed plate on said head engaging one side of said spline, an oppositely disposed plate adapted to be drawn into engagement with the opposite side of said spline, means to move said last mentioned plate into clamping position, and means to release said head when said means are operated to move said plate to its unclamping position.

In testimony whereof, I hereto affix my signature.

BRYANT H. BLOOD.